United States Patent [19]
Hoing et al.

[11] Patent Number: 5,767,644
[45] Date of Patent: Jun. 16, 1998

[54] STEERING WHEEL POSITION DETECTING DEVICE OF VEHICLE STEERING SYSTEM

[75] Inventors: Do-Chon Hoing; Song-Mu Choi, both of Seoul, Rep. of Korea

[73] Assignee: Kia Motors Corporation, Seoul, Rep. of Korea

[21] Appl. No.: 697,239

[22] Filed: Aug. 21, 1996

[30] Foreign Application Priority Data

Jul. 26, 1996 [KR] Rep. of Korea ............... 96-30566

[51] Int. Cl.[6] .................................................. B62D 15/02
[52] U.S. Cl. ............................................................. 318/489
[58] Field of Search ..................................... 318/489, 490;
364/424.051; 180/400, 428, 429

[56] References Cited

U.S. PATENT DOCUMENTS

| | | | |
|---|---|---|---|
| 4,955,228 | 9/1990 | Hirose et al. | 73/118.1 |
| 5,032,996 | 7/1991 | Shiraishi | 364/424.05 |
| 5,121,322 | 6/1992 | Shiraishi et al. | 364/424.05 |
| 5,146,202 | 9/1992 | Kashihara | 340/438 |
| 5,243,188 | 9/1993 | Hattori et al. | 250/231.17 |
| 5,309,758 | 5/1994 | Kubota et al. | 73/118.1 |
| 5,434,784 | 7/1995 | Bradley et al. | 364/424.05 |

*Primary Examiner*—Bentsu Ro
*Attorney, Agent, or Firm*—Lowe Hauptman Gopstein & Berner

[57] ABSTRACT

A steering wheel position detecting device of a vehicle steering system including a first ring-shaped track defining a space centered on a center of the steering wheel and a first ball provided within the first track for detecting a right turn of the steering wheel. The first track includes a first cutoff wall formed at a twelve o'clock position, a second cutoff wall formed at a six o'clock position to be partially opened towards the center of the steering wheel, and a third cutoff wall formed at an eleven o'clock position to be partially opened towards the center of the steering wheel. The first ball is positioned on a left side of the second cutoff wall and the first ball is movable through the opening formed on the second cutoff wall and the opening formed on the third cutoff wall. A second embodiment of the steering wheel position detecting device is designed for detecting a left turn of the steering wheel.

6 Claims, 3 Drawing Sheets

STEERING WHEEL POSITION DETECTING DEVICE OF VEHICLE STEERING SYSTEM

BACKGROUND OF THE INVENTION

The present invention relates to a steering system for controlling the direction of vehicle wheels and more particularly, it relates to a steering wheel position detecting device of a vehicle steering system that is mounted over the steering system to detect each directional orientation of wheels and turning motion of the steering wheel to which the manual turning pressure is applied by a driver.

When driving a large car or an automotive vehicle having ballon tires, the grounding resistance of the vehicle front wheels becomes increased which increases the amount of effort required to turn a steering wheel and interferes with rapidly transmitting the steering wheel's turning motion to turn the front wheels. Power steering is a steering control system for an automotive vehicle in which an auxiliary power source assists a driver by providing the majority of force required to direct the front wheels smoothly and promptly. In hydraulic power steering systems, an oil pump and cylinder add power to the manual turning power the driver provides.

This hydraulic steering mechanism has the following advantages. First, this allows a driver to turn the steering wheel with little effort, and he may select a steering gear without difficulty or restraint. Second, this mechanism precludes kickback of the steering wheel due to road shock. Third, shimmy, i.e. excessive vibration of the front wheels of an automotive vehicle, may be reduced.

This hydraulic power steering system consists of three major parts: power, operation and control systems.

The power system includes an oil pump driven by a vehicle's engine to provide hydraulic pressure that is a power source used for a booster, a pressure relief valve that relieves pressure beyond a specified limit and recloses upon return to normal operating conditions, and a flow control valve that controls the rate of flow of the fluid through it. The operation system serves to convert actuating fluid pressure pressurized by the oil pump into steering force on the vehicles front wheels, and includes a power cylinder. The control system by which the opening and closing of the operating system's hydraulic-fluid line is accomplished, controls the power cylinder's working direction and the power-adding operation. The control system includes a safety valve so as to turn the steering wheel even if the hydraulic system malfunctions.

There are many types of power steering systems. They may be classified in a number of ways, for example, by the shape and arrangement of control valves and power cylinders. When the power cylinder and the control valve are combined into one body, the power steering unit is called combined-type. When the power cylinder and the control valve are formed to be separated from each other, the power steering unit is called separated-type. When the power cylinder is incorporated in the steering gear unit, it is called integral-type of power steering unit. The combined-type power steering is usually employed for large trucks or buses with relatively large spaces on which the power cylinder and the control valve are installed. The separated-type power steering is used for small trucks or passenger cars that have a narrow space for the power cylinder and the control valve, and the integral-type power steering is in wide use for passenger cars or large automobiles since it may be designed to be small in size and its arrangement can be simplified.

The conventional steering systems, however, are not provided with a gauge indicating the position of vehicle wheels, and a driver sitting in a driver's seat cannot be exactly aware of the position of the vehicle wheels and their directional orientations with only a mark formed on the steering wheel when he starts up the parked car.

SUMMARY OF THE INVENTION

Accordingly, the present invention relates to a steering wheel position detecting device of a vehicle steering system that substantially solves one or more of the problems due to limitations and disadvantages of the related art. It is an object of the present invention to provide a steering wheel position detecting device of an automotive vehicle that may improve the steering mechanism so that a driver sitting in a driver's seat can be exactly aware of each directional orientation of vehicle wheels and the position of a steering wheel.

To achieve these and other advantages and in accordance with the purpose of the present invention, as embodied and broadly described, the steering wheel position detecting device of a vehicle steering system that has a steering wheel to which a manual turning pressure is applied by a driver, a steering column installed under the steering wheel, a combination of pinion and rack to convert torque produced by the steering column into rectilinear motion, and a tie rod extending from each end of the rack to control the direction of vehicle wheels, includes a disk provided to the end of the pinion to turn with the pinion, a slit formed on the disk's inboard surface, and a light-emitting diode and a photo-diode oppositely mounted on a position corresponding to the slit so that the disk is interposed therebetween. Thus, an output signal of the light-emitting diode can be transmitted to the photo-diode through the slit whereby tracing out the position of the steering wheel.

In case of designing a circuit in which the light-emitting diode and photo-diode are connected to an electronic control device, it is preferable that a gauge is provided to indicate the position of the steering wheel.

In another aspect, the steering wheel position detecting device of a vehicle steering system that has a steering wheel to which a manual turning pressure is applied by a driver, a steering column installed under the steering wheel, a combination of pinion and rack to convert torque produced by the steering column into rectilinear motion, and a tie rod extending from each end of the rack to control the direction of vehicle wheels, includes a first ring-shaped tract defining a space formed centering on a mark formed on the center of the steering wheel, having a first cutoff wall formed on its upper section. The first cutoff wall is formed at a twelve o'clock position to separate the track's one side from the other side, a second cutoff wall formed at a six o'clock position to be partially opened towards the mark, a third cutoff wall formed at an eleven o'clock position to be partially opened towards the mark, and a mobile ball provided to the second cutoff wall or third cut off wall through its opening whereby a right turn of the steering wheel is detected when the mobile ball is put on the left side of the second cutoff wall.

The steering wheel position detecting device of a vehicle steering system further includes a second ring-shaped track defining a space for detecting a left turn of the steering wheel when the third cutoff wall is at a one o'clock position and the ball is put on the right side of the second cutoff wall. The track may be covered with a transparent material in order that a driver can detect the turning motion of the steering wheel by the position of the ball inside of the track.

BRIEF DESCRIPTION OF THE ATTACHED DRAWINGS

These and other features, aspects and advantages of the present invention will become better understood with regard to the following description, appended claims, and accompanying drawings wherein:

DETAILED DESCRIPTION OF PREFERRED EMBODIMENT

Figure 1:
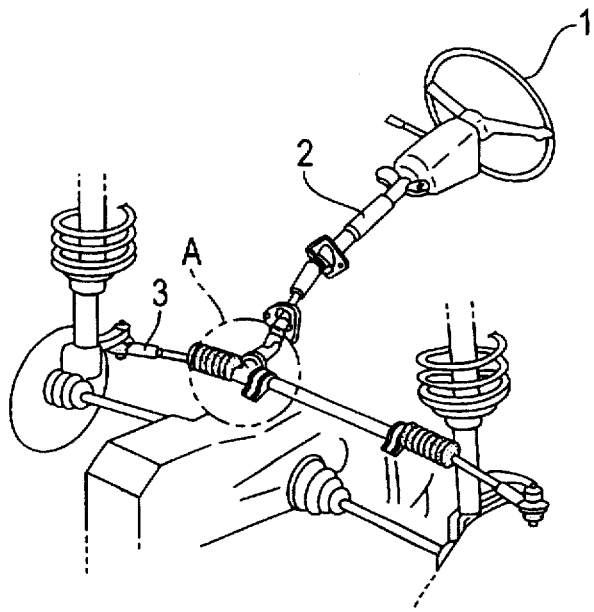
FIG. 1 is a perspective view of a common type of the steering mechanism.
Figure 2:
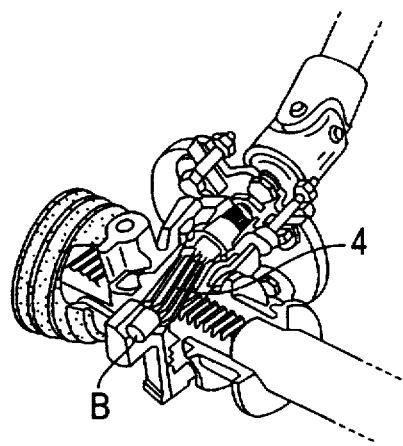
FIG. 2 is an enlarged view of part A appearing in FIG. 1
Figure 3:
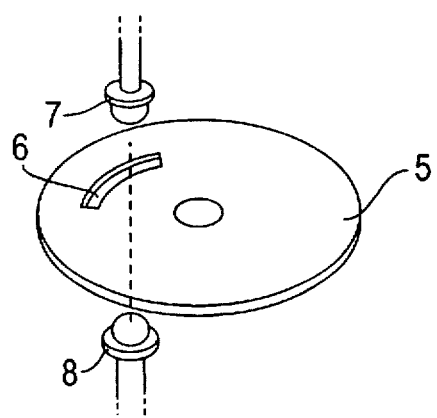
FIG. 3 is a perspective view of a disk of a steering wheel position detecting device in accordance with a first preferred embodiment of the present invention.

As shown in FIGS. 1 and 2, a common-type steering mechanism includes a steering wheel 1 to which the manual turning pressure is applied by a driver, a steering column 2 installed under the steering wheel 1, a combination A of pinion and rack to convert torque produced by the steering column 2 into rectilinear motion, and a tie rod 3 extending from each end of the rack to control the direction of vehicle wheels. In accordance with a first preferred embodiment of the present invention, a disk 5 is provided to the end of the pinion 4, and turns with the pinion 4. Referring to FIG. 3, the disk 5 has a slit 6 formed on its inboard surface. Each one of light-emitting diode 7 and photo-diode 8 is mounted on a position corresponding to the slit 6 so that the disk 5 is interposed between the diodes 7 and 8. Thus, an output signal of the light-emitting diode 7 can be transmitted to the photo-diode 8 through the slit 6 so as to trace out the position of the steering wheel.

In the meantime, when designing a circuit in which the diodes 7 and 8 are connected to an electronic control device, it is preferable that a gauge is provided to either indicate the position of the steering wheel 1 or indicate an output obtained by processing the signal of the light-emitting diode 7 that is input to the photo-diode 8, without regard to the electronic control device.

FIGS. 4A to 4G depict a steering wheel position detecting device of a vehicle steering system in accordance with a second preferred embodiment of the present invention.

As shown in the drawings, the steering wheel 1 has a ring-shaped track 10 defining a doughnut-shaped space in it, centering on the mark 9, and the track 10 has a first cutoff wall 11 formed on its upper section, i.e. at a twelve o'clock position to separate the track's one side from its other side. In addition, a second cutoff wall 12 is formed in the track at six o'clock position to be partially opened towards the mark 9, and a third cutoff wall 13 is formed therein at an eleven o'clock position to be partially opened towards the mark 9. A small mobile ball 14 is provided to the second cutoff wall 12 or third one 13 through its opening. Section C of the track 10 is formed by the first and second cutoff walls 11 and 12, and Section D is formed by the second and third cutoff walls 12 and 13. Section E of the track 10 is interposed between the first and third cutoff walls 11 and 13.

Figure 4A:
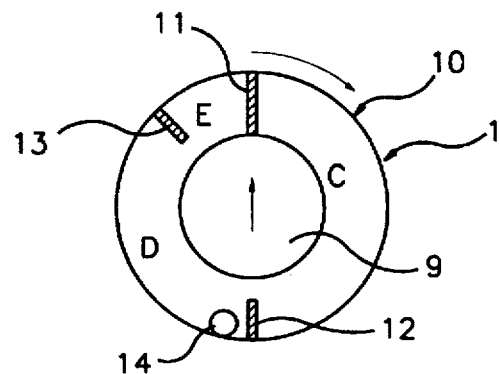
FIGS. 4A to 4G depict a steering wheel position detecting device of a vehicle steering system in accordance with a second preferred embodiment of the present invention.
Figure 4B:
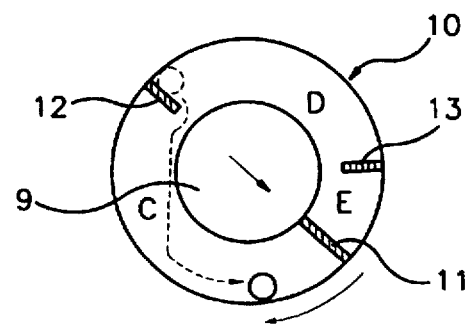
Figure 4C:
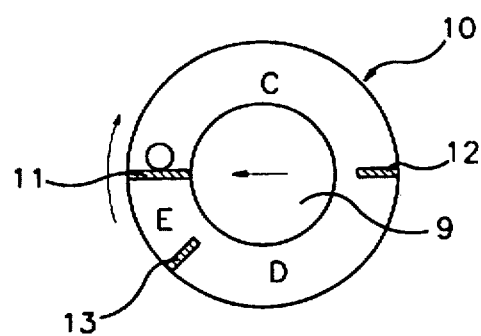
Figure 4D:
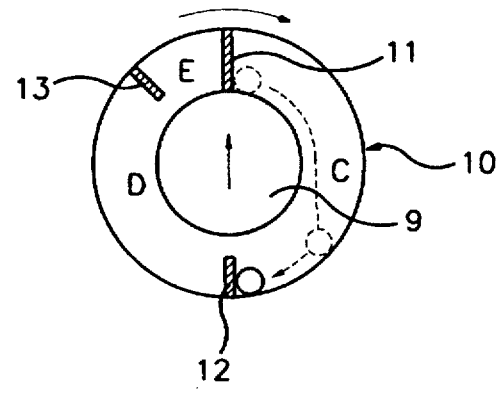
Figure 4E:
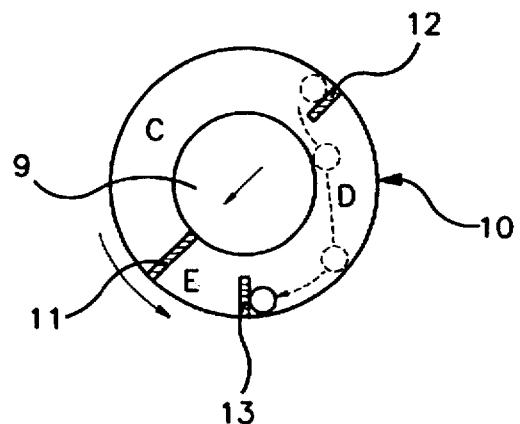
Figure 4F:
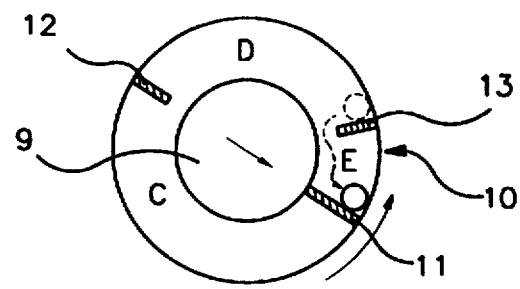
Figure 4G:
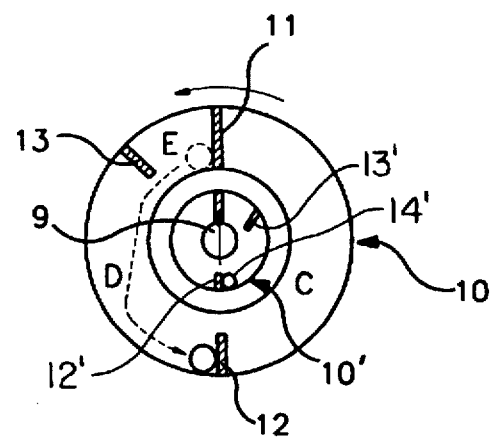

According to the above mechanism, FIG. 4A shows the position of the vehicle wheels that are in a straight line parallel to the car body, and the ball 14 is put on the left side of the second cutoff wall 12. When the steering wheel 1 is turned to right, the ball 14 is moved upward by the second cutoff wall 12, and comes to enter Section C through the opening of the second cutoff wall 12 as the turning angle of the steering wheel is over predetermined degrees. When the steering wheel 1 is turned by 270 degrees, as shown in FIG. 4C, the ball 14 comes to be on the first cutoff wall 11 at the level of the second cutoff wall 12. When the steering wheel is turned round by 360 degrees, the ball is put on the right side of the second cutoff wall 12, which is clearly understood from FIG. 4D. Referring to FIGS. 4E to 4G, as the steering wheel is turned to its original position, the ball 14 comes to be on the left side of the second cutoff wall 12 through Section D, E and C.

When it comes to providing another ring-shaped track 10' defining a doughnut shaped space on the steering wheel 1, as depicted in FIG. 4G, the third cutoff wall 13' is at a one o'clock position, and the ball 14' is put on the right side of the second cutoff wall 12' to detect a left turn of the steering wheel. Once the steering wheel 1 is then turned round by 360 degrees, the ball 14' is put on the left side of the second cutoff wall 12', and when the steering wheel is turned to its original position, the ball 14' comes to be on the right side of the second cutoff wall 12'.

The inventive steering wheel having two ring-shaped tracks with different diameters is covered with a transparent material so that a driver can detect the steering wheel's turning motion and present position by the position of the ball 14' shown through the transparent cover of the steering wheel.

The steering wheel position detecting device of an automotive vehicle in accordance with the present invention allows a driver who is sitting on a driver's seat to be exactly aware of each directional orientation of vehicle wheels and the position of a steering wheel.

Therefore, it should be understood that the present invention is not limited to the particular embodiments disclosed herein as the best mode contemplated for carrying out the present invention, but rather that the present invention is not limited to the specific embodiments described in this specification except as defined in the appended claims.

What is claimed is:

1. A steering wheel position detecting device of a vehicle steering system having a steering wheel to which a manual turning pressure is applied by a driver, a steering column installed under the steering wheel, a combination of pinion and rack to convert torque produced by the steering column into rectilinear motion, and a tie rod extending from each end of the rack to control the direction of vehicle wheels, said steering wheel position detecting device comprising a first ring space formed centering on a mark formed on the center of the steering wheel, having a first cutoff wall formed on its upper section, at twelve o'clock position to completely separate said ring space's one side from the other side, a second cutoff wall formed at six o'clock position to be partially opened towards the mark, a third cutoff wall formed at eleven o'clock position to be partially opened towards the mark, and a mobile ball provided to said second cutoff wall or third cutoff wall through its opening whereby a right turn of the steering wheel is detected when said mobile ball is put on the left side of said second cutoff wall.

2. The device as claimed in claim 1, further comprising a second ring space for detecting a left turn of the steering wheel when said third cutoff wall is at one o'clock position and the mobile ball is put on the right side of said second cutoff wall, said ring spaces being covered with a transparent material so that the driver can detect the turning motion of the steering wheel by the position of the mobile ball inside of said ring spaces.

3. A steering wheel position detecting device comprising:
   a first ring-shaped track defining a space, said first track being centered on a center of the steering wheel, said first track including:

a first cutoff wall formed at a twelve o'clock position, said first cutoff wall separating one side of said first track from another side, a second cutoff wall formed at a six o'clock position to be partially opened towards the center of the steering wheel, and a third cutoff wall formed at an eleven o'clock position to be partially opened towards the center of the steering wheel; and a first ball provided on a left side of said second cutoff wall, said first ball being movable through the opening formed on said second cutoff wall and the opening formed on said third cutoff wall whereby a right turn of the steering wheel is detected.

4. The device according to claim 3, further comprising:

a second ring-shaped track defining a space, said second track being centered on the center of the steering wheel, said second track including:

a first cutoff wall formed at a twelve o'clock position to separate one side of said second track from another side, a second cutoff wall formed at a six o'clock position to be partially opened towards the center of the steering wheel, and a third cutoff wall formed at a one o'clock position to be partially opened towards the center of the steering wheel; and a second ball provided on a right side of said second cutoff, said second ball being movable through the opening formed on said second cutoff wall and the opening formed on said third cutoff wall whereby a left turn of the steering wheel is detected.

5. The device according to claim 4, further comprising a transparent member covering said first track and said second track, whereby a driver can detect the positions of said first ball within said first track and said second ball within said second track.

6. A steering wheel position detecting device comprising:

a ring-shaped track defining a space, said track being centered on a center of the steering wheel, said track including:

a first cutoff wall formed at a twelve o'clock position, said first cutoff wall separating one side of said track from another side, a second cutoff wall formed at a six o'clock position to be partially opened towards the center of the steering wheel, and a third cutoff wall formed at a one o'clock position to be partially opened towards the center of the steering wheel; and a ball provided on a right side of said second cutoff wall, said ball being movable through the opening formed on said second cutoff wall and the opening formed on said third cutoff wall whereby a left turn of the steering wheel is detected.

* * * * *